(12) United States Patent
Turtinen et al.

(10) Patent No.: US 12,245,309 B2
(45) Date of Patent: Mar. 4, 2025

(54) BEAM FAILURE RECOVERY FOR DORMANT BANDWIDTH PART

(71) Applicant: Nokia Technologies Oy, Espoo (FI)

(72) Inventors: Samuli Heikki Turtinen, Il (FI); Timo Koskela, Oulu (FI); Jarkko Tuomo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 378 days.

(21) Appl. No.: 17/795,004

(22) PCT Filed: Jan. 26, 2021

(86) PCT No.: PCT/EP2021/051654
§ 371 (c)(1),
(2) Date: Jul. 25, 2022

(87) PCT Pub. No.: WO2021/151849
PCT Pub. Date: Aug. 5, 2021

(65) Prior Publication Data
US 2023/0142247 A1 May 11, 2023

Related U.S. Application Data

(60) Provisional application No. 62/966,102, filed on Jan. 27, 2020.

(51) Int. Cl.
| | |
|---|---|
| *H04W 76/19* | (2018.01) |
| *H04W 24/10* | (2009.01) |
| *H04W 36/06* | (2009.01) |
| *H04W 72/044* | (2023.01) |

(52) U.S. Cl.
CPC .......... *H04W 76/19* (2018.02); *H04W 24/10* (2013.01); *H04W 36/06* (2013.01); *H04W 72/044* (2013.01)

(58) Field of Classification Search
CPC ..... H04W 76/19; H04W 24/10; H04W 36/06; H04W 72/044; H04B 7/0695
See application file for complete search history.

(56) References Cited

U.S. PATENT DOCUMENTS

| | | | |
|---|---|---|---|
| 2020/0052769 A1* | 2/2020 | Cirik | H04L 5/0094 |
| 2022/0312519 A1* | 9/2022 | Xu | H04W 72/044 |

OTHER PUBLICATIONS

LG Electronics—Consideration on power saving for NR—Jan. 21-25, 2019, 3GPP TSG RAN WG1 Ad-Hoc Meeting (Year: 2019).*
Qualcomm: "Solutions for Fast SCG and SCell Activation", 3GPP TSG-RAN Ad-Hoc Meeting, Taipei, Taiwan Jan. 21-25, 2019 (Year: 2019).*

(Continued)

*Primary Examiner* — Thu V Nguyen
*Assistant Examiner* — Ranjan Pant
(74) *Attorney, Agent, or Firm* — Robert P. Michal, Esq.; Carter, DeLuca & Farrell LLP

(57) ABSTRACT

Example embodiments of the invention provide at least a method and apparatus to perform at least identifying, by a user equipment of a communication network, a beam failure occurred over at least one dormant bandwidth part for communication with at least one secondary cell of the communication network; and based on the identifying, determining to report the beam failure to the communication network for beam failure recovery by the communication network.

1 Claim, 4 Drawing Sheets

(56) References Cited

OTHER PUBLICATIONS

Qualcomm Incorporated, "Remaining issues of dormancy behaviour", 3GPP TSG RAN WG2 Meeting #108, R2-1914363, Reno, Nevada, Nov. 18-22, 2019.
LG Electronics, "Considerations on power saving for NR", 3GPP TSG RAN WG1 Ah-Hoc Meeting 1901, R1-1900602, Taipei, Taiwan, Jan. 21-25, 2019.
Nokia et al., "Remaining details of SCell BFR", 3GPP TSG-RAN WG2 Meeting #108, R2-1915332, Reno, USA, Nov. 18-22, 2019.

* cited by examiner

410: identifying, by a user equipment of a communication network, a beam failure occurred over at least one dormant bandwidth part for communication with at least one secondary cell of the communication network 420: based on the identifying, determining to report the beam failure to the communication network for beam failure recovery by the communication network.

FIG. 4

BEAM FAILURE RECOVERY FOR DORMANT BANDWIDTH PART

CROSS REFERENCE TO RELATED APPLICATION

This patent application is a U.S. National Stage application of International Patent Application Number PCT/EP2021/051654 filed Jan. 26, 2021, which is hereby incorporated by reference in its entirety, and claims priority to US 62/966,102 filed Jan. 27, 2020, which is hereby incorporated by reference in its entirety.

TECHNICAL FIELD

The teachings in accordance with the exemplary embodiments of this invention relate generally to reporting to a network a beam failure for beam failure recovery and/or bandwidth switching based on the beam failure and, more specifically, relate to reporting to a network a beam failure for beam failure recovery and/or bandwidth switching based on the beam failure, the beam failure occurring over at least one dormant bandwidth part with a secondary cell for beam failure recovery.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
- 3GPP Third Generation Partnership Project
- BFD Beam Failure Detection
- BFR Beam Failure Recovery
- BWP Bandwidth Part
- CDMA Code Division Multiple Access
- eMIMO Enhanced Multiple Input Multiple Output
- eNB Base Station
- FDMA Frequency Division Multiple Access
- gNB Base Station
- OFDMA Orthogonal Frequency Division Multiple Access
- PCell Primary Cell
- PSCell Primary Secondary Cell
- SCell Secondary Cell
- SC-FDMA Single-Carrier Frequency Division Multiple Access
- SpCell Special Cell (PCell/PSCell)
- TD-SCDMA Time Division Synchronous Code Division Multiple Access
- UE User Equipment Communication systems such as wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a global level. One current telecommunication standard is 5G New Radio (NR) which was promulgated by Third Generation Partnership Project (3GPP) to meet new requirements for improved communications. These improvements may also be applicable to other multi-access technologies such for carrier aggregation that employ these technologies.

Example embodiments of the invention work to provide at least such improvements.

SUMMARY

In an example aspect of the invention, there is an apparatus, such as a network side apparatus, comprising: at least one processor; and at least one memory including computer program code, where the at least one memory and the computer program code are configured, with the at least one processor, to cause the apparatus to at least: identifying, by a user equipment of a communication network, a beam failure occurred over at least one dormant bandwidth part for communication with at least one secondary cell of the communication network; and based on the identifying, determining to report the beam failure to the communication network for beam failure recovery by the communication network.

In another example aspect of the invention, there is a method comprising: identifying, by a user equipment of a communication network, a beam failure occurred over at least one dormant bandwidth part for communication with at least one secondary cell of the communication network; and based on the identifying, determining to report the beam failure to the communication network for beam failure recovery by the communication network.

A further example embodiment is a method comprising the method of the previous paragraph, wherein there is, based on determining to report the beam failure, sending towards the communication network a report of the beam failure, wherein the reporting comprises a candidate beam indication indicating that no candidate reference signal for the communication is available, wherein there is determining if at least one non-dormant bandwidth part is configured with candidate reference signal list, wherein for a case it is determined by the user equipment that the non-dormant bandwidth part is not configured with a candidate reference signal list, wherein the reporting comprises reporting to the communication network a candidate beam indication indicating that no candidate reference signal for the communication is available, wherein for a case it is determined by the user equipment that the non-dormant bandwidth part is configured with a candidate reference signal list, wherein there is based on the candidate reference signal list, the user equipment searching for a candidates reference signal in a non-dormant bandwidth part, wherein the searching is based on a frequency domain location and bandwidth of the non-dormant bandwidth part corresponding to at least one of the dormant bandwidth part or including the dormant bandwidth part, wherein the indication is sent towards the communication network one of before or after the switching to another bandwidth part of the communication network, wherein there is in response to the identifying, switching to a non-dormant bandwidth part of the communication network, wherein the switching comprises: determining that the non-dormant bandwidth part overlaps the at least one dormant bandwidth part of the communication network based on the non-dormant bandwidth part being in the candidate reference signal list identified by the user equipment, wherein the non-dormant bandwidth part is one of provided in a configuration received from the communication network by the user equipment or based on a frequency location of the user equipment in relation to the non-dormant bandwidth part, wherein the candidate reference signal list is of one of the non-dormant bandwidth part or at least one of the at least one secondary cell, a primary cell, primary secondary cell, or a special cell, wherein the configuration received from the communication network comprises cell candidate measurement instructions, wherein there is starting a timer in response to the beam failure, wherein at an expiration of the timer there is switching to a non-dormant bandwidth part of the communication network for the communication, and wherein there is receiving from the communication network while the timer is running, by the user equipment, an indication to switch to the non-dormant bandwidth part; and in response to an expiration of the timer, triggering by the user equipment the beam failure recovery for the at least one dormant bandwidth part.

A non-transitory computer-readable medium storing program code, the program code executed by at least one processor to perform at least the method as described in the paragraphs above.

In another example aspect of the invention, there is an apparatus comprising: means for identifying, by a user equipment of a communication network, a beam failure occurred over at least one dormant bandwidth part for communication with at least one secondary cell of the communication network; and means, based on the identifying, for determining to report the beam failure to the communication network for beam failure recovery by the communication network.

In accordance with the example embodiments as described in the paragraph above, at least the means for identifying and determining comprises a network interface, and computer program code stored on a computer-readable medium and executed by at least one processor.

A further example embodiment is an apparatus comprising the apparatus of the previous paragraphs, wherein there is, based on determining to report the beam failure, sending towards the communication network a report of the beam failure, wherein the reporting comprises a candidate beam indication indicating that no candidate reference signal for the communication is available, wherein the at least one memory including the computer program code is configured with the at least one processor to cause the apparatus to perform: determining if at least one non-dormant bandwidth part is configured with candidate reference signal list, wherein for a case it is determined by the user equipment that the non-dormant bandwidth part is not configured with a candidate reference signal list, wherein the reporting comprises reporting to the communication network a candidate beam indication indicating that no candidate reference signal for the communication is available, wherein for a case it is determined by the user equipment that the non-dormant bandwidth part is configured with a candidate reference signal list, wherein there is based on the candidate reference signal list, the user equipment searching for a candidates reference signal in a non-dormant bandwidth part, wherein the searching is based on a frequency domain location and bandwidth of the non-dormant bandwidth part corresponding to at least one of the dormant bandwidth part or including the dormant bandwidth part, wherein the indication is sent towards the communication network one of before or after the switching to another bandwidth part of the communication network, wherein there is, in response to the identifying, switching to a non-dormant bandwidth part of the communication network, wherein the switching comprises: determining that the non-dormant bandwidth part overlaps the at least one dormant bandwidth part of the communication network based on the non-dormant bandwidth part being in the candidate reference signal list identified by the user equipment, wherein the non-dormant bandwidth part is one of provided in a configuration received from the communication network by the user equipment or based on a frequency location of the user equipment in relation to the non-dormant bandwidth part, wherein the candidate reference signal list is of one of the non-dormant bandwidth part or at least one of the at least one secondary cell, a primary cell, primary secondary cell, or a special cell, wherein the configuration received from the communication network comprises cell candidate measurement instructions, wherein the at least one memory including the computer program code is configured with the at least one processor to cause the apparatus to perform: starting a timer in response to the beam failure, wherein at an expiration of the timer there is switching to a non-dormant bandwidth part of the communication network for the communication, and wherein the at least one memory including the computer program code is configured with the at least one processor to cause the apparatus to perform: receiving from the communication network while the timer is running, by the user equipment, an indication to switch to the non-dormant bandwidth part; and in response to an expiration of the timer, triggering by the user equipment the beam failure recovery for the at least one dormant bandwidth part.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 4 shows a method that can be executed by an apparatus in accordance with example embodiments of the invention.

DETAILED DESCRIPTION

Figure 1:
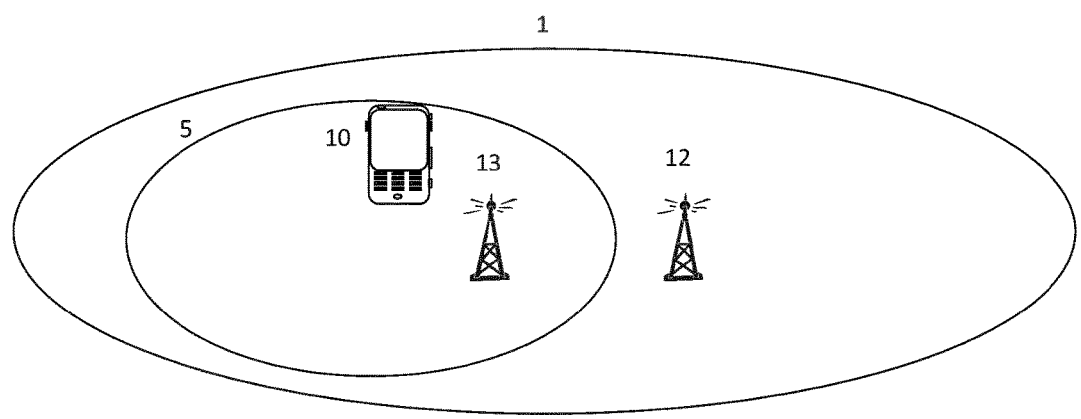
FIG. 1 shows a diagram illustrating an example of a User Equipment (UE) in partially overlapping cells.

In example embodiments of this invention, there is proposed a novel method of reporting to a network a beam failure, the beam failure occurring over at least one dormant bandwidth part with a secondary cell for beam failure recovery.

UE may be configured with one or more bandwidth parts (BWP) for a cell. In 3GPP standards at the time of this application it was agreed to define dormant like behaviour with multiple BWPs i.e. at most one BWP is dormant BWP and one or more is non-dormant BWP or first BWP after dormancy, or first BWP that UE switches to after dormant BWP (possible other BWPs are considered here as regular BWP). In some cases the BWPs that are not dormant, may be referred as non-dormant BWPs. Dormant BWP is a BWP without PDCCH monitoring and also not having most if any UL operation. In some cases, UE may perform measurements and reporting on downlink reference signals on the dormant BWP. Then network can switch between dormant and non-dormant BWPs with an indication (for example "1-bit indication") which can be on inside or outside active time (slightly different signalling). In other words when network indicates UE to switch from dormant BWP to non-dormant BWP, UE switches to first non-dormant BWP ID (for example PDCCH monitoring and other procedures or tasks that are configured for the said BWP) from dormant BWP. The first non-dormant BWP ID can be different for inside active time or outside active time. In a release at the time of this application, the release associated with eMIMO, it was introduced to have also beam failure recovery for SCells but it has not been yet been solved (or discussed) in 3GPP how do beam failure detection and recovery operations work in dormant BWP.

For SCell BFR following has been agreed in RAN2 meetings:

Agreements:
1. The Scell beam failure detection is per cell.
2. Each DL BWP of a SCell can be configured with an independent SCell BFR configuration (the content is FFS)
3. One SR ID is configured for BFR within the same cell group.
4. The SCell BFRQ MAC CE triggers a SCell BFRQ SR if there is no valid uplink grant which can accommodate the SCell BFRQ MAC CE.
5. FFS whether the transmission of the SCell BFRQ MAC CE cancels the pending BFRQ SR of the failed SCell (s). (depends whether the MAC CE provides info for one or more Scells)
6. When the number of the BFRQ SR transmission reaches the sr-TransMax, the UE triggers a RACH procedure (i.e. reuse Rel-15 behaviour)

Agreements:
1. beamFailureDetectionTimer and beamFailureInstanceMaxCount are configured cell specifically per each DL BWP configured.
2. Upon reconfiguration of beamFailureDetectionTimer, beamFailureInstanceMaxCount, or any of the reference signals used for beam failure detection by upper layers, BFI_COUNTER is set to 0 for the given Serving Cell.
3. When SCell BFR SR resource is not configured and SCell BFR MAC CE transmission triggers SCell BFR SR, Random Access procedure on SpCell is triggered to request UL resources to transmit the SCell BFR MAC CE (similarly to Rel-15 behaviour on SR).
4. when SCell BFR SR is triggered and the UE has an overlapping SR PUCCH resource with the SCell BFR SR PUCCH resource, the UE shall select the SCell BFR SR PUCCH resource for transmission.
5. Pending SR for SCell beam failure recovery triggered prior to the MAC PDU assembly shall be cancelled when the MAC PDU is transmitted and this PDU includes a SCell BFR MAC CE.
6. SCell BFR MAC CE can carry information of multiple failed SCells, ie., multiple entry format for SCell BFR MAC CE is defined.
7. For each SCell, the SCell BFR MAC CE indicates the following information:
   information about the failed SCell index;
   indication if a new candidate beam RS is detected or not;
   new candidate beam RS index (if available).
8. SCell BFR MAC CE has higher priority at least than "data from any Logical Channel, except data from UL-CCCH" and LBT MAC CE, higher priority is FFS.

Example embodiments of the invention work to improve operations associated with at least the underlined areas of the agreement above.

Referring also to FIG. 1, a UE 10 may be connected to more than one cell at a same time. In this example the UE 10 is connected to a PCell 1 through a base station 12 (such as an eNB or gNB for example) and a SCell 5 through a base station 13 (such as an eNB, gNB, or Wi-Fi Access Point for example). The two cells 1 and 5 are, thus, at least partially overlapping. The PCell 1 may operate on a licensed band or unlicensed band and similarly the SCell 5 may operate on a licensed or unlicensed band, such as ISM bands. In certain scenarios, the SCell may operate also on licensed band(s). The PCell may be either a FDD cell or TDD cell for example.

For simplicity, there are just one PCell and one SCell depicted in the scenario shown in FIG. 1. In other alternate examples any number of cells (PCell and SCell or multiple SCells) operating on licensed and/or unlicensed band(s) may be provided to work together for a suitable Carrier Aggregation (CA). In one example, CA may be e.g. intra-band, inter-band or both. For example when UE uses licensed LTE, unlicensed LTE and Wi-Fi connections may be activated to perform aggregation over the three radio technologies to reach highest bit rates when seen feasible and UE and network support this. A Wi-Fi link in accordance with the exemplary embodiments can be utilized in an unlicensed band, unless also licensed variant is specified. In one type of example embodiment the PCell and SCell may be co-located.

In 3GPP standards at the time of this application, beam failure recovery is determined for active serving cells i.e. there is defined the BFR for PCell and defined the BFR for SCell. However, the 3GPP standards at the time of this application do not consider the beam failure recovery when the UE declares a beam failure on dormant BWP.

Example embodiments of the invention work to address at least these issues by providing UE operation when it is on dormant BWP and it determines that beam failure has occurred (UE has determined that it performs beam failure detection on the dormant BWP).

Figure 2:
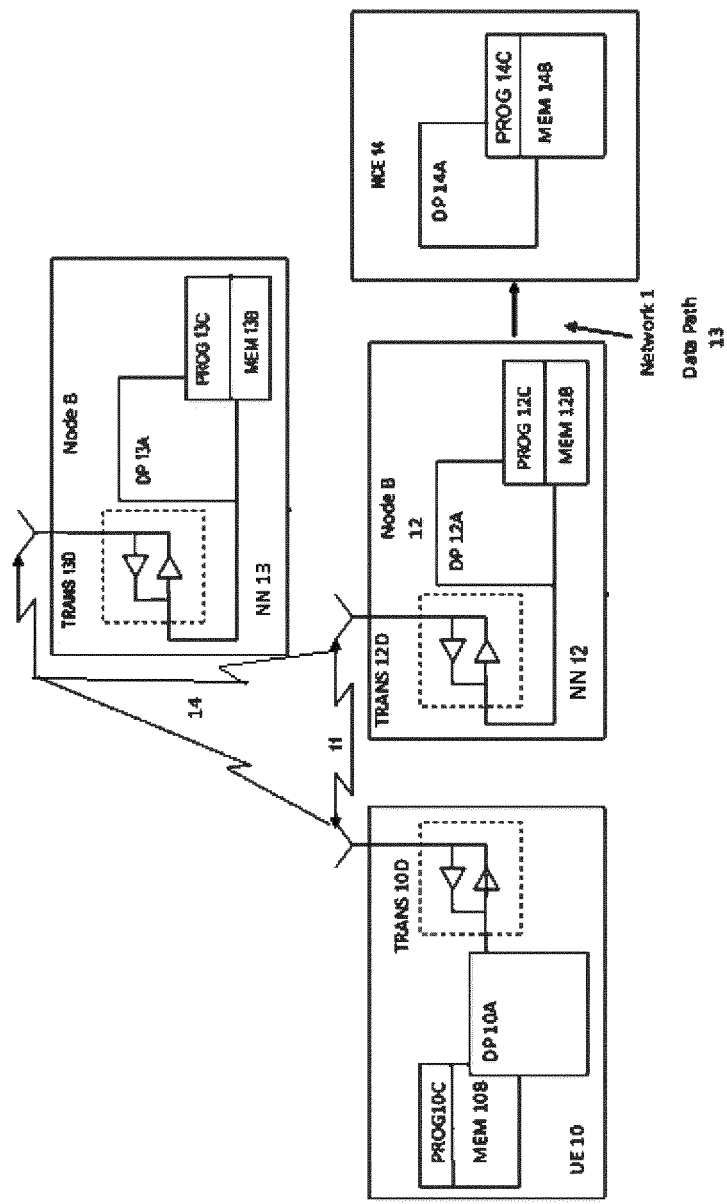
FIG. 2 shows a high level block diagram of various devices that can be used in carrying out various aspects of the invention.

Before describing the example embodiments of the invention in detail, reference is made to FIG. 2 for illustrating a simplified block diagram of various electronic devices that are suitable for use in practicing the example embodiments of this invention.

FIG. 2 shows a block diagram of one possible and non-limiting exemplary system in which the example embodiments of the invention may be practiced. In FIG. 2, a user equipment (UE) 10 is in wireless communication with a wireless network 1. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 111.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 2. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/SGW/AMF/UPF device such as the NCE 14 of FIG. 2. The NN 12 may perform functionalities of an MME (Mobility Management Entity) or SGW (Serving Gateway), such as a User Plane Functionality, and/or an Access Management functionality for LTE and similar functionality for 5G.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/SGW/AMF/UPF device such as the NCE 14 of FIG. 2.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 2 shows a network nodes Such as NN 12 and NN 13. Any of these nodes may can incorporate or be incorporated into an eNodeB or eNB or gNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE) 14 that may include an AMF (Access and Mobility Management Functionality), MME (Mobility Management Entity)/SGW (Serving Gateway) functionality, and which provides connectivity with a further network, such as a telephone network and/or a data communications network (e.g., the Internet). The NN 12 and the NN 13 are coupled via a link 13 and/or link 14 to the NCE 14. In addition, it is noted that at least some of the operations in accordance with example embodiments of the invention, as performed by the NN 13, may also be performed at the NCE 14.

The NCE 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP 10, DP 12A, DP 13A, and/or DP 14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP 10, DP 12A, DP 13A, and DP 14A may be of any type suitable to the local technical environment, and may include one or more of general purpose computers, special purpose computers, microprocessors, digital signal processors (DSPs) and processors based on a multi-core processor architecture, as non-limiting examples. The processors DP 10, DP 12A, DP 13A, and DP 14A may be means for performing functions, such as controlling the UE 10, NN 12, NN 13, and other functions as described herein.

In accordance with an example embodiments of the invention there is proposed UE operations as follows when the UE is on dormant BWP and it determines that beam failure has occurred (UE has determined to perform beam failure detection on the dormant BWP or UE has determined that it needs to perform beam failure recovery when it is on dormant BWP).

In one example embodiment, in accordance with example embodiments of the invention when UE declares beam failure on dormant BWP it triggers SCell BFR reporting.

In one example, any of the methods presented herein the embodiments may be used for recovering from beam failure of a PCell and/or SCell in general i.e., with or without dormant BWP configuration.

In one example, any of the methods presented herein the beam failure may refer to beam failure detection based on BFD-RS (beam failure detection reference signals) or any other DL reference signals and/or their respective quality (RSRP/RSRQ/SINR/hypothetical PDCCH BLER or the like) or any other means used to determine failure or the beam failure may refer to beam failure due to Listen Before Talk (LBT) failure.

Operations in accordance with example embodiments of the invention include as follows:
  In one example, when UE declares beam failure on the dormant BWP of the SCell it indicates the SCell failure with candidate beam indication indicating that no candidates are available. As an example, when reporting SCell failure on dormant BWP with the candidate beam indication set to '0' it reports that no candidates available. (This stems from the fact that NW knows the UE to be in a dormant BWP). In one option the candidate beam indication can also be set to '1' to indicate no candidate available in this case.
  In one further example, UE may be configured to indicate DL RS (RS index) if no candidate RS list is configured, where the DL RS may be an SS/PBCH block (UE may then indicate SSB index/SSB time location index/SSB Resource indicator). Alternatively, if RS list (list of candidate beams that UE can indicate to network and refer with an index, SSB/CSI-RS) is configured and no suitable candidate can be indicated in the RS list UE may indicate DL RS outside the candidate list. As an example, when the candidate indication (e.g. one bit indication associated with failed SCell index) is set to '1' UE indicates candidate on the RS list (if above quality threshold), if set to '0' UE indicates DL RS index e.g. SSB index (or CSI-RS). SSB (or CSI-RS) selection may be then similar to contention based RACH procedure.
  In one further example when UE has reported or successfully reported the failure of the SCell based on monitoring of dormant BWP it switches to the non-dormant BWP.
  In one further example, UE may be configured to indicate only SCell failure when it determines beam failure (or determines that beam recovery is needed) on dormant BWP (and indicate e.g. no candidate to network) and switch to first non-dormant BWP and trigger new signaling to indicate SCell failure with candidate information, if new candidate beam exists e.g. candidate beam/DL RS/RS index in the candidate list is measured to have RSRP/RSRQ/SINR or the like above signal quality threshold level;
  In one alternative example when UE declares beam failure, it switches to the non-dormant BWP and reports SCell beam failure:
    if the non-dormant BWP is not configured with candidate RS list, UE reports the failed SCell and indicates no candidate in the MAC CE, e.g., SCell BFR MAC CE;
  In an alternative, if the non-dormant BWP is configured with candidate RS list, UE searches or determines for candidates in the non-dormant BWP:
    In one option, the active BWP is kept to be dormant BWP,
    In one option, the candidates are searched from non-dormant BWP only if the non-dormant bandwidth part's frequency domain location and bandwidth corresponds to the dormant bandwidth part or if the non-dormant bandwidth part's frequency domain location and bandwidth includes the dormant bandwidth part,
    In one option, The BWP where to search candidates can also be other than non-dormant BWP and may be configured by the NW or be based on the frequency location in relation to the dormant BWP;
  In one aspect, the NW can configure whether the UE should attempt to search for candidates from another BWP (different from dormant BWP) or whether the UE should report "no candidate" immediately to the NW upon declaring beam failure;
  In one aspect, the UE can determine whether a BWP overlaps with the dormant BWP in frequency domain (as in above) and if such BWP is configured with candidate RS list. If such BWP exists with configured candidate RS list, the UE searches for candidates there; otherwise, UE indicates "no candidate" to NW; and
  In one aspect, the UE can indicate candidate based on the candidate RS list of another active serving cell (SCell, PCell, PSCell, or SpCell):
    NW may configure the UE from which cell to measure the candidates.

Further the operations in accordance with example embodiments of the invention as discussed herein include operations for detection and recovery for a beam failure for the SCell with a candidate beam indication.

Figure 3A:
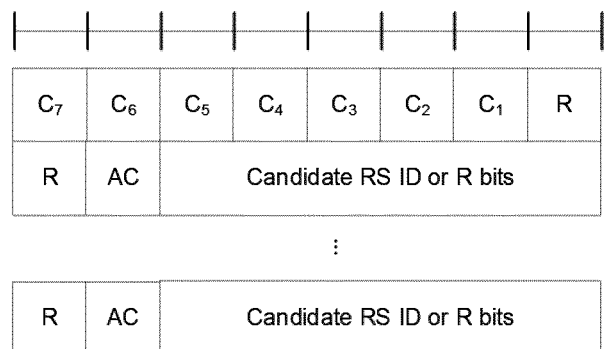
FIG. 3A and FIG. 3B each show an SCell BFR MAC CE that can be used in accordance with example embodiments of the invention.
Figure 3B:
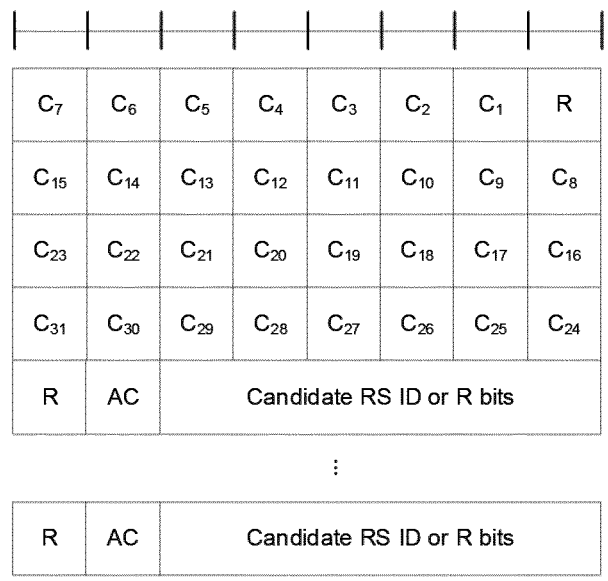

FIG. 3A and FIG. 3B each show a SCell BFR MAC CE which can be used to perform operations in accordance with example embodiments of the invention.

FIG. 3A and FIG. 3B each show a SCell BFR MAC CE which can be used to perform operations in accordance with example embodiments of the invention. FIG. 3A shows SCell BFR MAC CE with the highest ServCellIndex of this MAC entity's SCell configured with BFD is less than 8, and FIG. 3B shows SCell BFR MAC CE with the highest ServCellIndex of this MAC entity's SCell configured with BFD is equal to or higher than 8 (as shown in FIG. 3B).

Further shown in FIG. 3A and FIG. 3B is a Ci field is the bit that indicates that certain SCell has beam failure and AC is the candidate beam indication which can indicate whether candidate is available (instead of or in addition to indicating a beam failure as disclosed herein), and the SCell BFR MAC CE is identified by a MAC subheader with LCD as specified in FIG. 3A and FIG. 3B. The candidate beam indication has a variable size that can be predetermined.

The candidate beam indication can include a bitmap and in ascending order based on the ServCellIndex, octets containing candidate beam availability indication (AC) for SCells indicated in the bitmap. A single octet bitmap is used when the highest ServCellIndex of this MAC entity's SCell with configured BFD is less than 8 (as shown in FIG. 3A), otherwise four octets are used.

It is noted that as shown in FIG. 3A and FIG. 3B a Ci field is a bit that indicates that certain SCell has beam failure and AC is the candidate beam indication which indicates whether candidate is available.

With regards to FIG. 3A and FIG. 3B it is noted that the SCell BFR MAC CEs may be defined as follows:

Ci: This field indicates the presence of a octet containing AC field for the SCell with ServCellIndex i as specified in standards at the time of this application. If the Ci field set to 1, the octet containing AC field for the SCell with ServCellIndex i is present. If the Ci field set to 0, the octet containing AC field for the SCell with ServCellIndex i is not present, the octets containing the AC field are present in ascending order based on the ServCellIndex;

R: Reserved bit, set to 0;

AC: This field indicates the presence of Candidate RS ID field in this octet. If the AC field set to 1, Candidate RS ID is present. If the AC field set to 0, R bits are present instead; and Candidate RS ID: This field is set to the index of an SSB with SS-RSRP above rsrp-ThresholdSSB amongst the SSBs in candidateBeamRSSCellList or to the index of a CSI-RS with CSI-RSRP above rsrp-ThresholdCSI-RS amongst the CSI-RSs in candidateBeamRSSCellList. The length of this field can be any particular number of bits that work for the Candidate RS ID signaling, such as 6 bits.

In one embodiment, when UE declares beam failure on dormant BWP, it does not trigger BFR but continues beam failure detection procedure; or alternatively, BFR is triggered and remained pending but no reporting of the beam failure is performed.

Whenever the dormant BWP is switched to another BWP (non-dormant, regular, etc.) UE checks if the BFR is still pending:

In case BFR is pending or beam failure is considered as detected, UE initiates BFR reporting and searches for candidates from the active BWP (e.g., non-dormant BWP), and In case beamFailureDetectionTimer expires when the UE is in dormant BWP, the pending BFR is cancelled or beam failure is considered as not detected.

In one alternative embodiment, when UE has declared beam failure, a new timer is started. When the timer is running, UE considers the beam failure declaration to be pending and does not trigger recovery:

When the timer expires, UE triggers recovery (e.g. switches to non-dormant BWP and proceeds with candidate detection) as described in any of the embodiments herein, and If UE receives indication to switch to non-dormant, and the timer is running, the timer is expired/UE triggers recovery immediately In one example, if the beamFailureDetectionTimer expires while the new timer is running, the new timer is stopped or stopped and reset or cancelled, and UE determines that BFR declaration is cleared and UE continues beam failure detection.

In one alternative embodiment, when UE has declared beam failure and triggered beam failure reporting such that beam failure report is pending. Upon multiplexing the SCell BFR MAC CE into an uplink grant, the BFI_COUNTER (beam failure instance counter) can be set to 0 (zero) or reset in general. With doing so, the beam failure detection procedure is reset and beam failure is no longer declared, however, the beam failure reporting continues.

FIG. 4 illustrates operations which may be performed by a network device such as, but not limited to, a UE 10 as in FIG. 2. As shown in step 410 of FIG. 4 there is identifying, by a user equipment of a communication network, a beam failure occurred over at least one dormant bandwidth part for communication with at least one secondary cell of the communication network. then as shown in step 420 of FIG. 4 there is based on the identifying, determining to report the beam failure to the communication network for beam failure recovery by the communication network.

In accordance with the exemplary embodiments as described in the paragraph above there is, based on determining to report the beam failure and indication of new candidate beam if determined to be available, sending towards the communication network a report of the beam failure.

In accordance with the exemplary embodiments as described in the paragraphs above, wherein the reporting comprises an indication of failed SCell and candidate beam indication indicating that no candidate reference signal for the communication is available.

In accordance with the exemplary embodiments as described in the paragraphs above there is determining if at least one non-dormant BWP is configured with candidate reference signal list.

In accordance with the exemplary embodiments as described in the paragraphs above there is searching for a candidate reference signal list in a non-dormant bandwidth part.

In accordance with the exemplary embodiments as described in the paragraphs above, wherein for a case it is determined by the user equipment that the non-dormant bandwidth part is not configured with a candidate reference signal list.

In accordance with the exemplary embodiments as described in the paragraphs above, wherein the reporting comprises a candidate beam indication of the beam failure and that no candidate reference signal for the communication is available.

In accordance with the exemplary embodiments as described in the paragraphs above, there is determining if at least one non-dormant BWP is configured with candidate reference signal list, wherein for a case it is determined by the user equipment that the non-dormant bandwidth part is not configured with a candidate reference signal list, wherein the reporting comprises reporting to the communication network indication of the failed SCell and candidate beam indication indicating that no candidate reference signal for the communication is available.

In accordance with the exemplary embodiments as described in the paragraphs above, wherein the SCell beam failure reporting comprises a candidate beam indication and that no candidate reference signal for the communication is available.

In accordance with the exemplary embodiments as described in the paragraphs above, there is determining if at least one non-dormant BWP is configured with candidate reference signal list, wherein for a case it is determined by the user equipment that the non-dormant bandwidth part is not configured with a candidate reference signal list, wherein the reporting comprises reporting to the communication network a candidate beam indication indicating that no candidate reference signal for the communication is available.

In accordance with the exemplary embodiments as described in the paragraphs above, wherein the reporting of SCell beam failure comprises indication of the failed SCell and reporting to the communication network a candidate beam indication indicating that no candidate reference signal for the communication is available.

In accordance with the exemplary embodiments as described in the paragraphs above, wherein for a case it is determined by the user equipment that the non-dormant bandwidth part is configured with a candidate reference signal list, and further comprising: based on the candidate reference signal list, the user equipment searching for a candidate reference signal in a non-dormant bandwidth part.

In accordance with the exemplary embodiments as described in the paragraphs above, wherein the searching is based on a frequency domain location and bandwidth of the non-dormant bandwidth part corresponding to at least one of the dormant bandwidth part or including the dormant bandwidth part.

In accordance with the exemplary embodiments as described in the paragraphs above, wherein the indication is sent towards the communication network one of before or after the switching to another bandwidth part of the communication network.

In accordance with the exemplary embodiments as described in the paragraphs above there is, in response to the identifying, switching to a non-dormant bandwidth part of the communication network In accordance with the exemplary embodiments as described in the paragraphs above, wherein the switching comprises: determining that the non-dormant bandwidth part overlaps the at least one dormant bandwidth part of the communication network based on the non-dormant bandwidth part being in the candidate reference signal list identified by the user equipment.

In accordance with the exemplary embodiments as described in the paragraphs above, wherein the non-dormant bandwidth part is one of provided in a configuration received from the communication network by the user equipment or based on a frequency location of the user equipment in relation to the non-dormant bandwidth part.

In accordance with the exemplary embodiments as described in the paragraphs above, wherein the candidate reference signal list is of one of the non-dormant bandwidth part or at least one of the at least one secondary cell, a primary cell, primary secondary cell, or a special cell.

In accordance with the exemplary embodiments as described in the paragraphs above, wherein the configuration received from the communication network comprises cell candidate measurement instructions.

In accordance with the exemplary embodiments as described in the paragraphs above there is starting a timer in response to the beam failure, wherein at an expiration of the timer there is switching to a non-dormant bandwidth part of the communication network for the communication.

In accordance with the exemplary embodiments as described in the paragraphs above there is receiving from the communication network while the timer is running, by the user equipment, an indication to switch to the non-dormant bandwidth part; and in response to an expiration of the timer, triggering by the user equipment the beam failure recovery for the at least one dormant bandwidth part.

In accordance with example embodiments of the invention as described in the paragraphs above there is means for identifying (TRANS 10D; MEM 10B; PROG 10C; and DP 10A as in FIG. 3), by a user equipment (UE 10 as in FIG. 3) of a communication network (Network 1 as in FIG. 3), a beam failure occurred over at least one dormant bandwidth part for communication with at least one secondary cell of the communication network. In addition, means based on the identifying, for determining (TRANS 10D; MEM 10B; PROG 10C; and DP 10A as in FIG. 3) to report the beam failure to the communication network (Network 1 as in FIG. 3) for beam failure recovery by the communication network (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 3).

In the example aspect of the invention according to the paragraph above, wherein at least the means for identifying, determining, and reporting comprises a transceiver [one or more transceivers TRANS 10D as in FIG. 3], a non-transitory computer readable medium [one or more memories MEM 10B as in FIG. 3], encoded with a computer program [computer program code PROG 10C as in FIG. 3], executable by at least one processor [one or more processors DP 10A as in FIG. 3].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is intended to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A user equipment (UE) apparatus comprising:
   at least one processor; and
   at least one non-transitory memory including computer program code, where the at least one memory and the computer program code are configured, with the at least one processor, to cause the apparatus to at least perform:
   identifying that a beam failure occurred over at least one dormant bandwidth part for communication with at least one secondary cell of a communication network;
   based on the identifying, determining to report the beam failure to the communication network for beam failure recovery with the communication network;
   based on determining to report the beam failure, sending towards the communication network a report of the beam failure;
   determining if at least one non-dormant bandwidth part is configured with candidate reference signal list,
   wherein, when it is determined that the non-dormant bandwidth part is not configured with a candidate reference signal list, the reporting comprises reporting to the communication network a candidate beam indication indicating that no candidate reference signal for the communication is available, wherein the non-dormant bandwidth part is one of provided in a configuration received from the communication network by the user equipment or based on a frequency location of the user equipment in relation to the non-dormant bandwidth part, and wherein the configuration received from the communication network comprises cell candidate measurement instructions; and
   wherein when it is determined that the non-dormant bandwidth part is configured with a candidate reference signal list, performing based on the candidate reference signal list, searching for a candidate's reference signal in a non-dormant bandwidth part, wherein performing the searching is based on a frequency domain location and bandwidth of the non-dormant bandwidth part corresponding to the dormant bandwidth part and including the dormant bandwidth part,
   wherein the candidate reference signal list is of one of the non-dormant bandwidth part or the at least one secondary cell, a primary cell, primary secondary cell, and a special cell.

* * * * *